(12) United States Patent
Schmid et al.

(10) Patent No.: US 9,958,216 B2
(45) Date of Patent: May 1, 2018

(54) CONNECTING SYSTEM FOR A HEAT EXCHANGER

(71) Applicant: Behr GmbH & Co. KG, Stuttgart (DE)

(72) Inventors: Caroline Schmid, Stuttgart (DE); Michael Moser, Rainau (DE); Nikolaus Daubitzer, Stuttgart (DE); Holger Schroth, Maulbronn (DE); Heiko Neff, Auenwald (DE); Dominique Raible, Rottenburg (DE); Anton Kierig, Stuttgart (DE); Thomas Schiehlen, Altheim (DE); Nic Sautter, Plochingen (DE); Stefan Hirsch, Stuttgart (DE)

(73) Assignee: BEHR GMBH & CO. KG, Stuttgart (DE)

( * ) Notice: Subject to any disclaimer, the term of this patent is extended or adjusted under 35 U.S.C. 154(b) by 473 days.

(21) Appl. No.: 14/039,207

(22) Filed: Sep. 27, 2013

(65) Prior Publication Data

US 2014/0090803 A1   Apr. 3, 2014

(30) Foreign Application Priority Data

Sep. 28, 2012   (DE) .................. 10 2012 217 873

(51) Int. Cl.
*F28F 3/08* (2006.01)
*F28F 3/12* (2006.01)
(Continued)

(52) U.S. Cl.
CPC .................. *F28F 3/08* (2013.01); *F28F 3/12* (2013.01); *H01M 10/655* (2015.04);
(Continued)

(58) Field of Classification Search
CPC .... F28F 2275/02; F28F 3/08; F28F 2275/025; F28F 3/12; F28F 2240/00; F28F 2275/08;
(Continued)

(56) References Cited

U.S. PATENT DOCUMENTS 3,757,855 A      9/1973   Kun et al.
6,378,604 B1 *   4/2002   Feind ..................... F28F 3/044
                                                                165/165
(Continued)

FOREIGN PATENT DOCUMENTS

CN      2586125 Y      11/2003
CN    202074865 U      12/2011
(Continued)

OTHER PUBLICATIONS

WO 02/14771 English Translation.*

*Primary Examiner* — David Teitelbaum
*Assistant Examiner* — Nelson Nieves
(74) *Attorney, Agent, or Firm* — Paul D. Strain, Esq.; Strain & Strain PLLC

(57) ABSTRACT

The application relates to a heat exchanger and a connecting system for the heat exchanger. This subject matter includes a housing formed by a top part and a bottom part and a first connecting element and a second connecting element connected to these top and bottom parts. Specific embodiments of the subject matter are shown in which the connecting elements connect the housing top part and bottom part by a positive and/or material connection. The advantages of each embodiment over prior approaches are too numerous to include in this abstract, but will be apparent to one of ordinary skill in the art when reviewing the full specification.

3 Claims, 5 Drawing Sheets

(51) Int. Cl.
*H01M 10/655* (2014.01)
*F28D 21/00* (2006.01)

(52) U.S. Cl.
CPC .. *F28D 2021/0043* (2013.01); *F28F 2240/00* (2013.01); *F28F 2275/08* (2013.01)

(58) Field of Classification Search
CPC ........... F28F 2275/085; F28F 2275/143; F28F 9/0246; F28F 9/0248; F28F 9/0251; F28F 9/0256
See application file for complete search history.

(56) References Cited

U.S. PATENT DOCUMENTS

| | | | |
|---|---|---|---|
| 7,121,002 B1 | 10/2006 | Roth | |
| 2006/0288725 A1* | 12/2006 | Schlosser | F28D 1/05383 62/347 |
| 2008/0053645 A1* | 3/2008 | Hakamata | F28F 9/0226 165/173 |

FOREIGN PATENT DOCUMENTS

| | | | | |
|---|---|---|---|---|
| WO | WO 0214771 A2 * | 2/2002 | ............. | B21D 39/03 |
| WO | WO 2009000335 A1 * | 12/2008 | ......... | B29C 44/1228 |

* cited by examiner

CONNECTING SYSTEM FOR A HEAT EXCHANGER

CROSS-REFERENCE TO RELATED PATENT APPLICATIONS

This application is based upon and claims the benefit of priority from prior German Patent Application No. 10 2012 217 873.2, filed Sep. 28, 2012, the entire contents of which are incorporated herein by reference in their entirety.

FIELD OF THE INVENTION

The invention relates to a connecting system for a heat exchanger, the housing of which is formed by a housing top part and a housing bottom part, wherein the connecting system has a first and a second connecting element, by means of which the housing bottom part is connected to the housing top part by a positive and/or material connection.

PRIOR ART

Energy storage devices are used in electric vehicles to operate an electric motor. Accumulators based on lithium ions or nickel/metal hybrid accumulators are often used as energy storage devices in this context. As an alternative, high-performance capacitors, referred to as "supercaps", are also used.

With all the energy storage devices mentioned, there is severe heat generation during operation, especially during rapid charging and discharging of the energy storage devices.

However, temperatures of about 50° C. and above can damage the energy storage devices and significantly reduce their service life. Excessively low temperatures likewise permanently damage the energy storage devices.

In order to maintain the performance of the energy storage devices, the temperature thereof must therefore be actively controlled. Cooling periods make up a significantly greater proportion here. Cooling can be accomplished by introducing heat exchangers through which there is a flow of fluid, for example. According to prior art solutions, the heat exchangers are often elements through which there is a flow of fluid, having one or more fluid channels between two large-area cover plates, through which channels a fluid can flow.

In this case, it is advantageous if all the cells of the energy storage devices are held at a uniform temperature level. Steep temperature gradients within the cells should likewise be avoided.

In the case of cooling, a cold fluid can flow through the plates of the heat exchangers, but they can also receive a throughflow of a warm fluid for the purpose of heating.

In order to achieve maximum energy efficiency, a design which is as far as possible optimized in terms of weight is advantageous, especially in electric vehicles.

There are known prior art solutions which use heat exchangers that are manufactured completely of aluminum. This is the case, for example, in the unpublished application of the applicant with the file reference 10 2011 079 091.8.

The disadvantage with the prior art solutions is, in particular, the fact that the heat exchangers are constructed entirely from aluminum. These are significantly heavier than embodiments made of plastic or of a mixture of aluminum and plastic.

Moreover, electrical insulation and potential equalization of the heat exchangers is necessary, owing to the electrical conductivity of aluminum. In addition, the production of heat exchangers from aluminum is energy-intensive and expensive. Moreover, the use of auxiliary materials for soldering, e.g. fluxes, often makes finish-machining steps necessary. Heat exchangers which are produced entirely from plastic or from a mixture of plastic and metal components are often adhesively bonded. Owing to the boundary conditions prevailing at and around the heat exchangers, very high demands are made on the adhesive.

SUMMARY OF THE INVENTION, OBJECT, SOLUTION, ADVANTAGES

It is therefore the object of the present invention to provide a connecting system for a heat exchanger which has joints and adhesive bonding locations of optimized design configuration, making it possible to use a wider variety of adhesives. Moreover, the connecting system is intended to achieve optimized configuration of a heat exchanger in terms of weight, while making its production less energy-intensive and expensive.

The object of the present invention is achieved by a connecting system for a heat exchanger having the features according to Claim 1.

An illustrative embodiment of the invention relates to a connecting system for a heat exchanger, the housing of which is formed by a housing top part and a housing bottom part, wherein the connecting system has a first and a second connecting element, by means of which the housing bottom part is connected to the housing top part by a positive and/or material connection.

In one illustrative embodiment, the heat exchanger according to the invention is used to control the temperature of an energy storage device.

A connecting system of this kind can be used to produce a connection between a housing top part and a housing bottom part in a simple manner. This simplifies the construction of the heat exchanger.

It is also advantageous if the first connecting element on the housing top part has an inward-facing projection, and the second connecting element on the housing bottom part has an inward-facing receiving region or vice versa.

Using projections and receiving regions, the housing top part can be connected to the housing bottom part in a simple manner. The positioning of the housing parts relative to one another is thereby likewise simplified, as is the connection as a whole.

Moreover, it can be advantageous if the inner contour of the receiving region substantially follows the outer contour of the projection.

Mutually corresponding projections and receiving regions are particularly advantageous for secure connection of the housing parts to one another since, by this means, the housing parts can be positioned relative to one another and a good positive connection can be ensured.

It can also be expedient if the projection and/or the receiving region have spacing elements with respect to the housing top part and/or the housing bottom part.

According to an advantageous embodiment of the invention, provision can be made for a gap to form between the projection and the receiving region.

It can furthermore be particularly advantageous if the gap is substantially filled by an adhesive.

By means of one or more spacing elements, a defined spacing can be achieved between the connecting system and the housing parts. For example, gaps that form between the connecting system and the housing parts can be produced.

These gaps can be filled with sealants or adhesives, for example, in order to improve the connection between the housing parts and the connecting system.

A preferred illustrative embodiment is characterized in that the projection and/or the receiving region are designed in such a way that the projection engages at least partially behind the receiving region or the receiving region engages at least partially behind the projection.

By means of one or more arrangements involving rear engagement between the projection and the receiving region, a positive connection can be produced between the housing parts and the connecting system in addition to a material connection, which can be produced by adhesive bonding, for example.

Depending on the design of the rear engagement, the parts can be connected to one another simply by applying a force component. Latching elements which can be pressed into corresponding receptacles can be provided, for example.

It is also preferable if the receiving region has an opening through which the projection can be passed.

By passing a projection through an opening in the opposite housing part, it is advantageously possible to produce a positive connection. Depending on the design, the projection can also engage behind the opposite housing part and can, for example, likewise be connected thereto by means of latching elements by applying a fitting force.

In a particularly advantageous embodiment of the invention, it is furthermore envisaged that the projection passed through the opening can be fixed by means of an additional mechanical connection on the element which has the opening.

The projection can additionally be connected mechanically to the housing part which has the opening by means of rivets or crimping, for example. This makes the structure of the heat exchanger more stable and increases the life and load bearing capacity of the connection.

In an alternative embodiment of the invention, provision can be made for the connecting system to have a multiplicity of first and second connecting elements, wherein the first connecting elements are designed as boss-type elements and the second connecting elements are designed as connecting webs, and the connecting elements are connected to one another by the connecting webs on that side of the boss-type elements which faces the housing top part and/or the housing bottom part.

A connecting system of this kind can simply be placed in the cavity of the housing and connected there to the housing parts by means of material connection methods. Depending on the selection of material for the housing and the connecting elements, adhesive bonding methods, welding methods or soldering methods can be used to advantage.

It is furthermore to be preferred if the connecting system is in contact with the inside of the large-area surface of the housing top part and/or with the inside of the large-area surface of the housing bottom part.

By means of contact between the connecting system and the inner surfaces of the housing, secure seating of the connecting system in the housing can be achieved. In this case, the contact points can be adhesively bonded, connected to one another by a welding or soldering method or used to provide support for the connecting system relative to the housing.

It is also advantageous if the connecting webs and/or the boss-type elements have spacing elements which space the housing top part and/or the housing bottom part apart from the connecting system.

The interspace formed by the spacing elements between the housing parts and the connecting system can be used to connect the elements by means of an adhesive. The gap can serve as a reservoir for an adhesive, which is filled with an adhesive before the individual elements are connected.

It is furthermore to be preferred if the connecting webs have one or more heating elements.

By means of heating elements, which can be provided on the outer surfaces of the connecting webs for example, or can be embedded in the connecting webs, the fluid flowing through the housing or the housing parts themselves can be heated. Apart from the heat transfer from the flowing fluid, it is possible in this way to produce additional heat transfer by means of the heating elements.

According to a particularly preferred development of the invention, provision can be made for the connecting webs to have a large-area extent and to be aligned substantially parallel to the large-area surfaces of the housing.

By means of a large-area extent of the connecting webs, the contact surface between the connecting system and the housing parts can be increased. It is thereby possible to influence the connection between the connecting system and the housing parts in an advantageous way since larger surfaces are available for connection by means of an adhesive, for example.

In addition, it may be advantageous if the connecting webs are arranged alternately on that side of the connecting system which faces the housing top part and on that side of the connecting system which faces the housing bottom part.

An alternating arrangement of the connecting webs is particularly advantageous since heat transfer from the fluid to the outer surfaces of the housing is less hindered by the connecting system than in the case of a non-alternating arrangement of the connecting webs.

A preferred illustrative embodiment is characterized in that a fluid can be made to flow between the connecting webs and around the boss-type elements.

Another preferred illustrative embodiment is characterized in that the housing top part and/or the housing bottom part are adhesively bonded to the connecting system.

It is furthermore advantageous if the connecting system is formed from a plastic or from a metallic material.

Making the connecting system from a plastic, in particular, is advantageous in respect of component weight.

It is also advantageous if the housing has a fluid inlet and a fluid outlet, via which the heat exchanger is in fluid communication with a fluid circuit.

According to another illustrative embodiment, provision can be made for the housing bottom part to have a planar bottom region having encircling raised edge regions, and for the housing top part to be designed as a plate.

Advantageous developments of the present invention are described in the dependent claims and in the following description of the figures.

BRIEF DESCRIPTION OF THE DRAWINGS

The invention is explained in detail below by means of illustrative embodiments with reference to the drawings. In the drawings.

PREFERRED EMBODIMENT OF THE INVENTION

Figure 1:
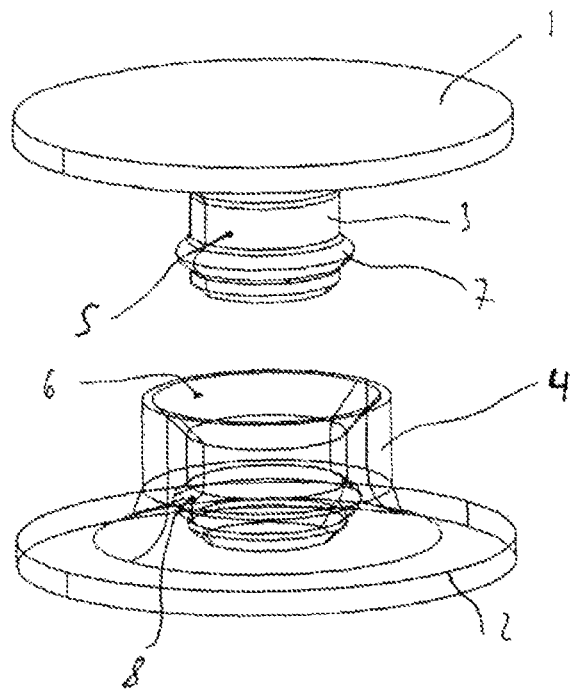
FIG. 1 shows a perspective view of a connecting system for connecting a housing top part to a housing bottom part of a heat exchanger.

FIG. 1 shows an exploded view of a connecting system of the kind which can be provided in a heat exchanger. The connecting system shown is used to connect a housing top part 1 and a housing bottom part 2. The housing top part 1 and the housing bottom part 2 are shown only indicatively in FIG. 1.

The connecting system essentially comprises a projection 3, which is arranged on the housing top part 1, and furthermore comprises a receiving region 4, which is arranged on the housing bottom part 2. The projection 3 and the receiving region 4 are arranged on the inward-facing side of the housing top part 1 and the housing bottom part 2, respectively. In a complete heat exchanger, the projection 3 and the receiving region 4 are consequently situated within the heat exchanger.

The projection 3 shown in FIG. 1 additionally has, on the outer contour 5 thereof, an encircling latching element 7, which can be received in a corresponding latching element receptacle 8 in the receiving region 4. The receiving region 4 has an inner contour 6 which corresponds to the outer contour 5 of the projection 3.

Owing to the encircling latching element 7, a certain fitting force has to be applied in order to press the projection 3 into the receiving region 4. In the finally assembled state, a small gap can remain between the outer contour 5 of the projection 3 and the inner contour 6. This gap can be filled with an adhesive or a sealant, for example.

The cylindrical design of the projection 3 and of the corresponding receiving region 4, as shown in FIG. 1, should be taken to be illustrative here. Embodiments that differ therefrom can likewise be provided. For example, the projection 3 could have a rectangular or oval base, and the corresponding receiving region 4 could likewise be adapted to a modified shape of the projection 3.

The indicated housing top part 1 belongs to a housing top part 1 of a heat exchanger, wherein the housing top part essentially has a planar extent. The indicated housing bottom part 2 is part of a substantially tray-shaped housing bottom part 2. With the housing top part 1, the housing bottom part 2 thus forms a housing which has an internal volume through which a fluid can flow. A heat exchanger can have a multiplicity of connecting systems shown in FIGS. 1 to 6.

Figure 2:
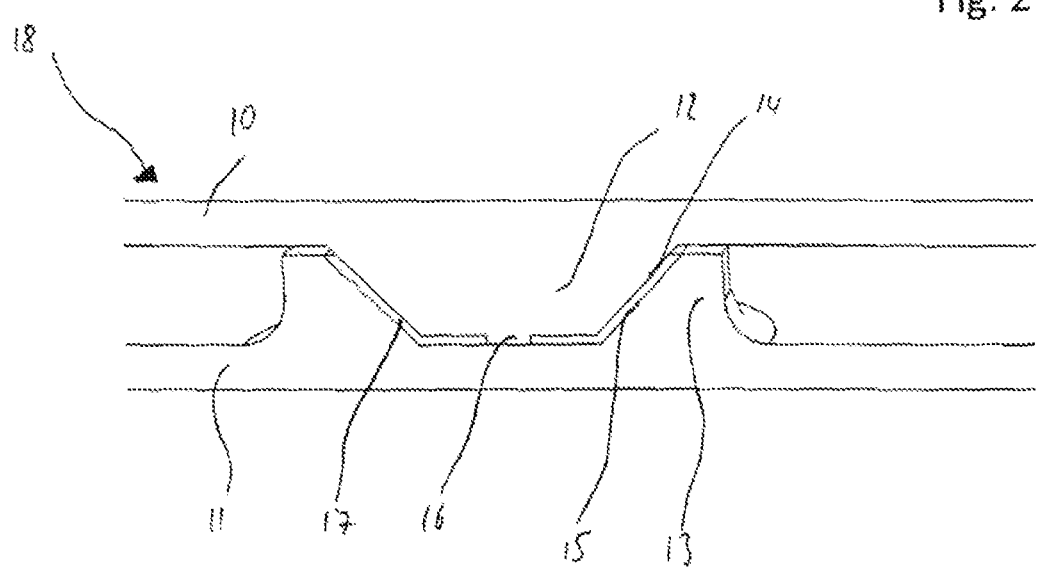
FIG. 2 shows an alternative embodiment of a connecting system according to FIG. 1.

FIG. 2 shows another illustrative embodiment of a connecting system 19 according to the invention. The housing top part 10 has a projection 12 which is inserted into a receiving region 13 on the housing bottom part 11. The projection 12 furthermore has a spacing element 16, which ensures that a gap 17 is formed between the receiving region 13 and the projection 12 in the finally assembled state.

This gap 17 can likewise be filled by an adhesive or a sealant, giving rise to a material connection between the housing top part 10 and the housing bottom part 11.

In FIG. 2, the projection 12 is formed by a cone-type projection. This cone-type projection has an outer contour 14 which corresponds to the inner contour 15 of the receiving region 13. The gap 17 fully encircles the projection 12. The spacing between the projection 12 and the receiving region 13 is similar all the way around.

The connecting system 19 between the housing top part and the housing bottom part 11 is part of the heat exchanger 18, which is not shown as a whole.

The receiving region 13 corresponding to the projection 12 makes it easier to position the housing top part 10 relative to the housing bottom part 11 since the cone-type design of the projection 12 ensures that self positioning of the housing top part 10 takes place as soon as the tip of the projection 12 is introduced into the receiving region 13.

In FIGS. 1 to 6, the housing top part and the housing bottom part can each be produced from a metallic material or from a plastic. Making one of the two parts from a plastic and the other part from a metallic material can likewise be envisaged.

Figure 3:
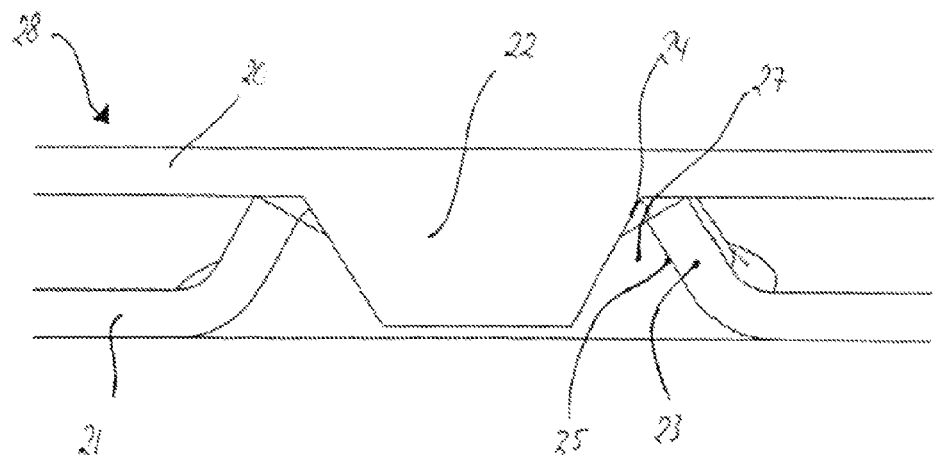
FIG. 3 shows an alternative embodiment of a connecting system according to FIGS. 1 and 2.

FIG. 3 shows another illustrative embodiment of a projection 22, which engages in a receiving region 23. The projection 22 is of cone-type design and tapers toward a point away from the housing top part 20. The projection 22 has a flattened tip.

The receiving region 23 is produced by bending up the housing bottom part 21. The projection 23 is produced, for example, by an embossing process which displaces material from the principal plane of the housing bottom part 21 in the direction of the housing top part 20. The housing bottom part 21 furthermore has an opening in the region of its receiving region 23.

The inner contour 25 of the receiving region 23 tapers toward a point, starting from the housing bottom part 21. The projection 22 tapers in the opposite direction. An encircling cavity 27, which can be filled with an adhesive, for example, is formed between the projection 22 and the receiving region 23.

In the illustrative embodiment in FIG. 3, this filling is particularly important since the housing bottom part 21 has an opening toward the bottom in the region of the receiving region 23 and is thus not closed in a fluidtight manner. Only when an adhesive or sealant is introduced does the connection between the housing top part 20 and the housing bottom part 21 become fluidtight.

Figure 4:
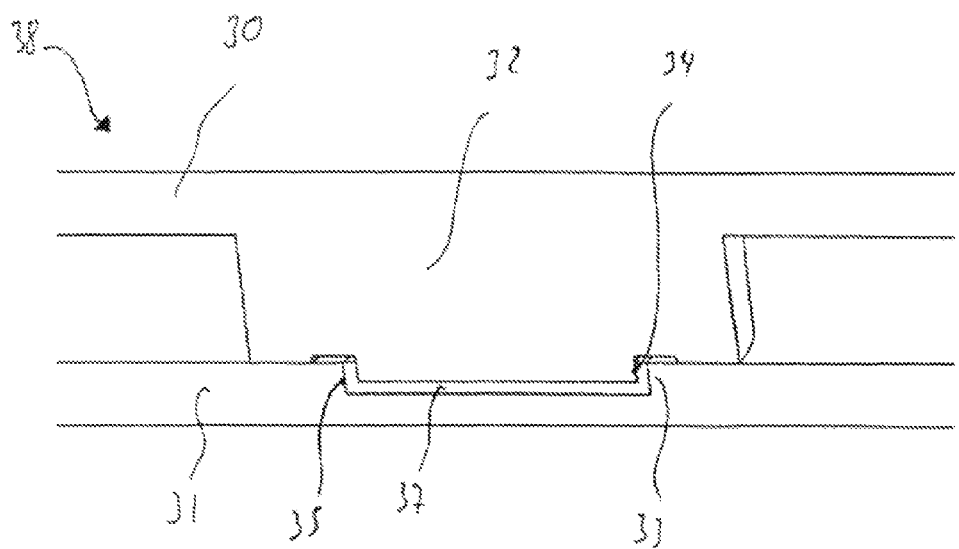
FIG. 4 shows an alternative embodiment of a connecting system according to FIGS. 1 to 3.

FIG. 4 shows another illustrative embodiment of a connecting system. The housing top part 30 has a cylindrical projection, which, at its end face facing away from the housing top part 30, has a further projection region, which engages in the housing bottom part 31.

The housing bottom part 31 has a receiving region 33, which is formed by a circular depression in the inner surface of the housing bottom part 31. Owing to the design configuration of the two parts, a gap 37 is provided between the projection 32 and the receiving region 33 in the finally assembled state. Once again, this gap can likewise be filled with an adhesive. For this purpose, the adhesive can be introduced into the receiving region 33 before the assembly process, for example.

The second projection region of the projection 32 is likewise of circular-cylindrical design. A groove is formed around this additional projection region, said groove extending in the end face of the projection 32 and thus forming a step between the end face of the projection 32 and the additional projection region. This groove likewise serves as a gap or as a receiving region for an adhesive or a sealant.

In the finally assembled state, the end face of the projection 32 rests against the inner surface of the housing bottom part 31, while the additional projection region engages in the receiving region 33. As described, the gap 37 is formed between the outer contour 34 of the additional projection region and the inner contour 35 of the receiving region 33.

Figure 5:
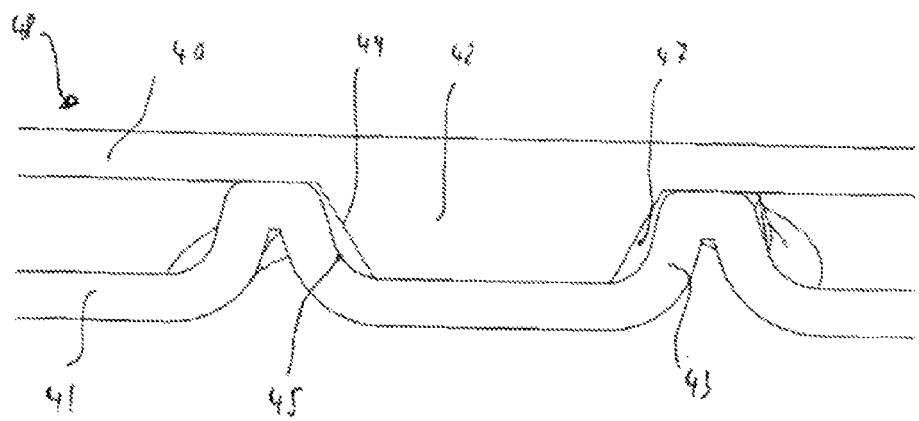
FIG. 5 shows an alternative embodiment of a connecting system according to FIGS. 1 to 4.

FIG. 5 shows another illustrative embodiment of a connecting system. The housing top part 40 is connected to the housing bottom part 41 in that a projection 42 which is of cone-type design and has a flattened tip engages in the receiving region 43 of the housing bottom part 41.

The receiving region 43 is formed from the housing bottom part 41 by an embossing process. The sectional view in FIG. 5 clearly shows that the receiving region 43 is produced essentially by two hump-type elevations on the housing bottom part 41. For this purpose, a punch can be driven into the housing bottom part 41 in such a way that an encircling circular receiving region 43 is formed, for example. Here, the punch essentially has two upward-projecting points. These are driven into the housing bottom part 41 from below.

A gap 47 is formed between the outer contour 44 of the projection 42 and the inner contour 45 of the receiving region 43, and this gap can advantageously be filled with a sealant or an adhesive. The connecting system shown is part of a heat exchanger 48.

Figure 6:
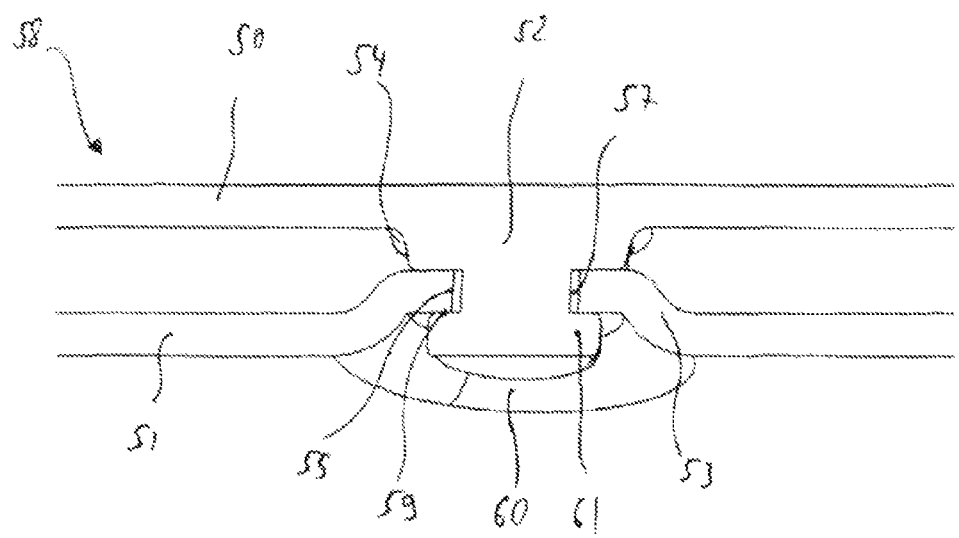
FIG. 6 shows an alternative embodiment of a connecting system according to FIGS. 1 to 5.

FIG. 6 shows another illustrative embodiment of a connecting system for a heat exchanger 58. In addition to the connection methods shown hitherto, a positive connection between the housing top part 50 and the housing bottom part 51 is now provided in the connecting system of FIG. 6, in addition to the material connection produced by an adhesive in gaps.

The projection 52 of the housing top part 50 is designed in such a way that it has a circular-cylindrical shape at the inner surface of the housing top part 50, adjoining which, when looking downward, there is a region which is likewise cylindrical but has a smaller diameter. This region of smaller diameter is followed by a third region, which has a larger diameter than the second region but a smaller diameter than the first region. All three regions are of circular-cylindrical design. In alternative embodiments, however, they can follow an oval basic shape, for example. The diameters of the individual regions can also vary.

The third region is denoted by reference sign 61 as a rear engagement region. Here, it engages behind the housing bottom part 51, which has an opening within the receiving region 53. In this case, the narrowest of the three regions of the projection 52 is dimensioned in such a way that an encircling gap 57 is formed between the opening in the receiving region 53 and this region. The upper region of the projection 52 rests against the inner surface of the housing bottom part 51, while the rear engagement region 61 of the projection 52 rests against the outer surface of the housing bottom part 51. A contact region 59 formed by the contact between the rear engagement region 61 and the housing bottom part 51 is thus formed.

To fit the projection 52 into the receiving region 53, a fitting force is required in order to pass the rear engagement region 61, which is larger in terms of size, through the opening in the receiving region 53. In the finally assembled state, a positive connection between the projection 52 and the receiving region 53 is ensured by the rear engagement region 61. In addition, an adhesive or a sealant can be introduced into the gap 57.

The receiving region 53, which has the opening through which the projection 52 engages, is formed from the principal plane of the housing bottom part 51 by an embossing process, for example, and lies above the principal plane of the housing bottom part 51.

A mechanical connecting means 60, which is mounted on the projection 52 from the underside of the housing bottom part 51, is additionally shown in FIG. 6. This can be a rivet, for example, or, alternatively, a screw fastener, which engages in the projection 52. By means of this mechanical connecting means 60, additional clamping of the housing top part 50 to the housing bottom part 51 is achieved.

All the illustrative embodiments shown in FIGS. 1 to 6 should be regarded as illustrative representations of a connecting system according to the invention. The embodiments of the projection and, in particular, of the receiving region which are shown are each illustrative, and designs which go beyond said forms that are shown can likewise be envisaged.

Figure 7:
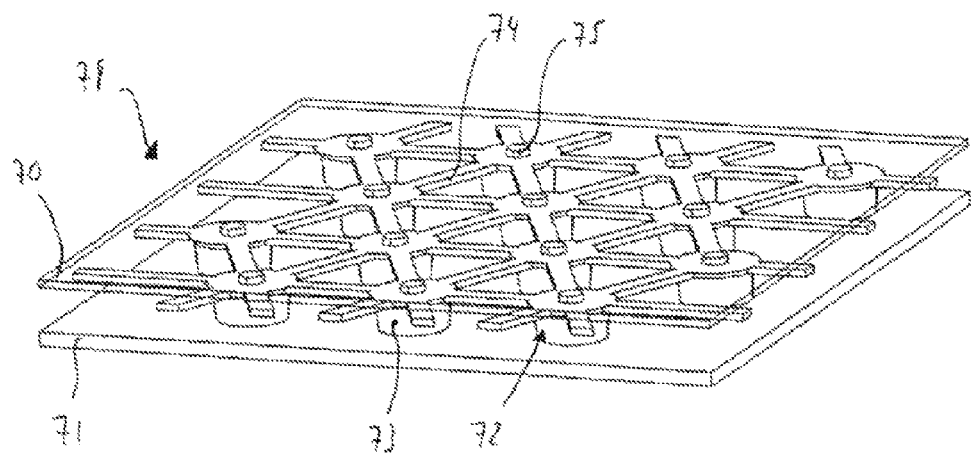
FIG. 7 shows a perspective view of a grid-type connecting system for connecting a housing top part to a housing bottom part of a heat exchanger.

FIG. 7 shows a connecting system 72 which is inserted in a heat exchanger 78 between a housing top part 70 and a housing bottom part 71. The connecting system 72 is used to connect the housing top part 70 to the housing bottom part 71.

Figure 8:
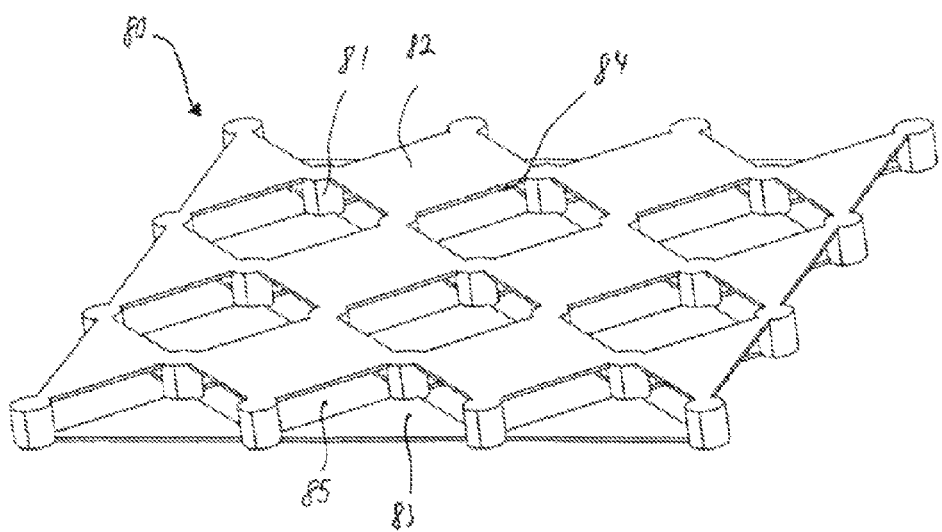
FIG. 8 shows an alternative embodiment of a connecting system in accordance with FIG. 7.
Figure 9:
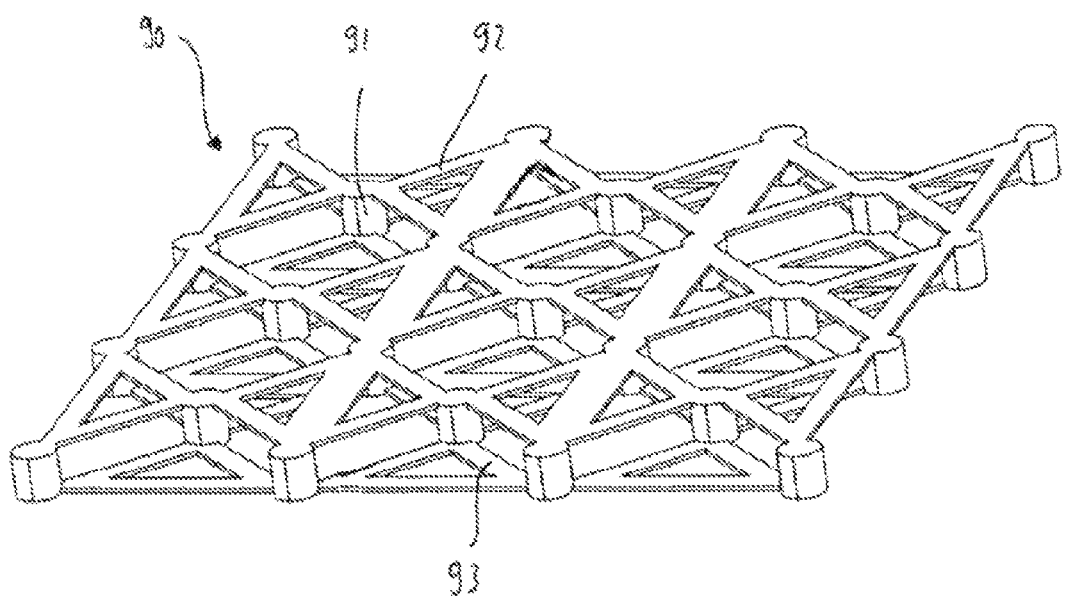
FIG. 9 shows an alternative embodiment of a connecting system in accordance with FIGS. 7 and 8.

The connecting system 72 and the connecting systems in FIGS. 8 and 9 can be inserted into a heat exchanger before the final connection of the housing top parts to the housing bottom parts, for example. In the finally assembled state, the connecting system is in contact both with the inner surface of the housing top part and with the inner surface of the housing bottom part.

The connecting system 72 consists of a multiplicity of boss-type elements 73, which are designed as cylindrical elements in FIG. 7. These boss-type elements 73 are connected to one another by a multiplicity of connecting webs 74, which are designed as connecting webs 74 of rectangular cross section in FIG. 7. Spacing elements 75, which space the housing top part 70 apart from the surface of the boss-type elements 73 and from the connecting webs 74, are provided on the top side of the boss-type elements 73.

The gap which is formed between the housing top part 70 and the connecting webs 74 or boss-type elements 73 can be filled with an adhesive, for example, for connection.

The connecting system 72 can advantageously be manufactured from a plastic and, in this case, can be produced by an injection molding method. As an alternative, however, it can also be produced from a metallic material, e.g. by punching out and soldering. The connection between the connecting system 72 and the housing bottom part 71 and housing top part 70 can be accomplished by conventional joining methods.

In an advantageous embodiment of the connecting system 72, the connecting webs 74 can have heating elements. These heating elements can be mounted on the surface of the connecting webs 74, for example, or, alternatively, can also be integrated directly within the connecting webs 74. This is appropriate especially when the connecting system 72 is produced by an injection molding method. Integrating the heating elements into the connecting webs 74 furthermore entails the advantage that additional electrical insulation of the heating elements is not necessary since this is already provided by the material of the connecting webs 74.

Each of the connecting webs 74 shown in FIG. 7 connects two boss-type elements 73 to one another. This gives rise to a grid-type pattern. The connecting webs 74 are formed on that end region of the boss-type elements 73 which faces the housing top part 70.

In alternative embodiments, free positioning of the connecting webs on the boss element 73 can also be envisaged. It is likewise possible to arrange connecting webs on the top and bottom end regions of the boss-type element 73. The spacing elements 75 shown here, which are formed by a cylindrical extension on the surface of the boss-type element 73, should likewise be regarded as illustrative here. Other spacing elements can likewise be envisaged.

FIG. 8 shows an alternative embodiment of a connecting system 80. The basic structure of the connecting system 80 is once again formed by boss-type elements 81, which are connected to one another by connecting webs 82, 83. In the illustrative embodiment in FIG. 8, the connecting webs 82, 83 are embodied as large-area elements. In the example shown, each of the connecting webs 82, 83 connects four boss-type elements 81 to one another. This applies at least to the majority of the boss-type elements 81. The connecting webs 82, 83 arranged at the edge of the connecting system 80 intermittently connect a smaller number of boss-type elements 81 to one another.

In the illustrative embodiment in FIG. 8, the connecting webs 82, 83 are formed both on the upper end region of the boss-type elements 81 and on the lower end region of the boss-type elements 81. Here, the connecting webs 82 situated at the top and the connecting webs 83 situated at the bottom are arranged alternately, giving a rhombic pattern to the connecting system 80, a connecting web being arranged in the upper region, followed by a connecting web 83 arranged in the lower region, of the boss-type element 81, in each case in alternation. Thus, a connecting web 82 always follows an opening 84 at the upper surface of the connecting system 80. In the lower end region of the connecting system 80, a connecting web 83 is in each case followed by an opening 85.

The advantage of the connecting webs 82, 83 of large-area type is that a larger connecting surface with the housing top part and housing bottom part (not shown here) is available. This can be coated with an adhesive in order to produce a connection to a surrounding housing. As already indicated in FIG. 7, it is likewise possible for heating elements to be integrated into the connecting webs 82, 83 or to be mounted on the surface thereof. Similarly to FIG. 7, the connecting system 80 can likewise be produced from a plastic or a metallic material. With a view to an embodiment which is optimum in terms of weight, an embodiment made of a plastic, e.g. by means of an injection molding method, is to be preferred.

FIG. 9 shows another illustrative embodiment of a connecting system 90. In this case, the structure corresponds essentially to that of FIG. 8. As a departure from the embodiment in FIG. 8, the connecting webs 92, 93 are now no longer of large-area design, as in FIG. 8, but once again embodied as webs with a rectangular cross section.

As also indicated in FIG. 8, connecting webs 92 are arranged on the upper end region of boss-type element 91 and connecting webs 93 are arranged on the lower end region of boss-type element 91. The upper connecting webs 92 and the lower connecting webs 93 are arranged alternately at the top and bottom, as described in FIG. 8.

Similarly to FIG. 8, heating elements can be mounted on or integrated into the connecting webs 92, 93.

The invention claimed is:

1. A connecting system for a heat exchanger comprising:
 a housing, wherein the housing is formed by a housing top part and a housing bottom part, wherein an outer surface of the housing top part is planar, wherein an outer surface of the housing bottom part is planar,
 a first connecting element and a second connecting element, wherein the housing bottom part is connected to the housing top part by a positive and/or material connection between the first connecting element and the second connecting element, wherein the first connecting element is arranged on the housing top part and has a projection which projects from an inner surface of the top part towards the bottom part, wherein the second connecting element is arranged on the housing bottom part has a receiving region which projects from the inner surface of the bottom part towards the housing top part, wherein the first connecting element comprises a cone-type projection having angled sides, wherein the second connecting element comprises a complimentary region to the cone-type projection having angled sides, wherein there is a uniform gap between the cone-type projection and the receiving region when the heat exchanger is in an assembled state, wherein the gap fully encircles the cone-type projection, wherein the cone-type projection comprises a spacing element arranged on an end surface of the cone-type projection, wherein the spacing element projects from the end surface of the cone-type projection towards the receiving region and abuts a parallel surface of the receiving region parallel to the end surface of the cone-type projection such that the gap is also formed between the end surface of the cone-type projection and the parallel surface of the receiving region, wherein the gap is entirely filled by an adhesive, wherein a height of the spacing element is equal to a height of the uniform gap between the cone-type projection and the receiving region.

2. The connecting system for a heat exchanger according to claim 1, wherein an inner contour of the receiving region substantially follows an outer contour of the cone-type projection.

3. A plate type heat exchanger having a connecting system according to claim 1, wherein the housing has a fluid inlet and a fluid outlet, via which the heat exchanger is in fluid communication with a fluid circuit.

\* \* \* \* \*